United States Patent
Loui et al.

(10) Patent No.: US 8,548,256 B2
(45) Date of Patent: Oct. 1, 2013

(54) METHOD FOR FAST SCENE MATCHING

(75) Inventors: Alexander C. Loui, Penfield, NY (US); Madirakshi Das, Penfield, NY (US); Xu Chen, Ann Arbor, MI (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 616 days.

(21) Appl. No.: 12/828,330

(22) Filed: Jul. 1, 2010

(65) Prior Publication Data

US 2012/0002868 A1 Jan. 5, 2012

(51) Int. Cl.
*G06K 9/68* (2006.01)

(52) U.S. Cl.
USPC ........... 382/218; 382/165; 382/159; 382/199; 382/203; 382/181; 382/190; 382/201; 382/224; 382/306; 382/305

(58) Field of Classification Search
USPC ................. 382/218, 165, 305, 159, 199, 203, 382/181, 190, 201, 224, 306
See application file for complete search history.

(56) References Cited

U.S. PATENT DOCUMENTS

| | | | |
|---|---|---|---|
| 6,606,411 B1 | 8/2003 | Loui et al. | |
| 2002/0131641 A1* | 9/2002 | Luo et al. | 382/218 |
| 2006/0120590 A1* | 6/2006 | Han et al. | 382/154 |
| 2009/0161962 A1* | 6/2009 | Gallagher et al. | 382/203 |

OTHER PUBLICATIONS

Lowe, "Distinctive Image Features from Scale Invariant Keypoints," Intl. Journal of Computer Vision, vol. 60, pp. 91-110 (2004).
Bay et al., "SURF: Speeded Up Robust Features," Computer Vision and Image Understanding, vol. 110, pp. 346-359 (2008).
Ke et al., "PCA-SIFT: A More Distinctive Representation for Local Image Descriptors," Proc. IEEE Conference on Computer Vision and Pattern Recognition (2004).
Jones et al., "Face Recognition Using Boosted Local Features," Proc. IEEE Conference on Computer Vision (2003).
Duda et al., "Pattern Classification" Second Edition, Wiley, New York (2001).
Tong et al., "Blur Detection for Digital Images Using Wavelet Transform," Proc. IEEE International Conference on Multimedia and Expo, pp. 17-20 (2004).
Jones et al., "Rapid Object Detection using a Boosted Cascade of Simple Features", Proc. IEEE Conference on Computer Vision and Pattern Recognition, 2001.

* cited by examiner

*Primary Examiner* — Mike Rahmjoo

(57) ABSTRACT

A method for identifying digital images having matching backgrounds from a collection of digital images, comprising using a processor to perform the steps of: determining a set of one or more feature values for each digital image in the collection of digital images, wherein the set of feature values includes an edge compactness feature value that is an indication of the number of objects in the digital image that are useful for scene matching; determining a subset of the collection of digital images that are good candidates for scene matching by applying a classifier responsive to the determined feature values; applying a scene matching algorithm to the subset of the collection of digital images to identify groups of digital images having matching backgrounds; and storing an indication of the identified groups of digital images having matching backgrounds in a processor-accessible memory.

18 Claims, 6 Drawing Sheets

METHOD FOR FAST SCENE MATCHING

CROSS-REFERENCE TO RELATED APPLICATIONS

Reference is made to commonly assigned, co-pending U.S. patent application Ser. No. 11/960,800, entitled: "Grouping Images By Location", by Andrew C. Gallagher et al., which is incorporated herein by reference.

FIELD OF THE INVENTION

This invention pertains to the field of image processing and more particularly to a method for efficiently identifying digital images having matching backgrounds.

BACKGROUND OF THE INVENTION

Scene matching refers to the process of matching a region in one image with the corresponding region in another image, where both image regions are part of the same scene. Scene matching plays an important role in determining the location of a digital image, since most digital images lack detailed location information. Even though some recent cameras have the ability to determine location using global positioning system (GPS) technology, only a small fraction of the digital images being captured today include location information. In the absence of this location information, the location at which a digital image was captured can often be determined by identifying unique objects in the stationary background that can be matched to images having a known location using a scene matching algorithm.

Earlier work on scene matching involved computing correlation between images. However, in addition to being very computationally intensive, these methods cannot handle the large variations in scale, lighting, and pose encountered in consumer images. There has been recent work on matching feature-rich complex scenes using scale-invariant features (SIFT) as described by Lowe in the article "Distinctive image features from scale invariant keypoints" (Intl. Journal of Computer Vision, Vol. 60, pp. 91-110, 2004). Other similar approaches include the SURF algorithm disclosed by Bay et al. in the article "SURF: Speeded up robust features" (Computer Vision and Image Understanding, Vol. 110, pp. 346-359, 2008) and the PCA-SIFT algorithm disclose by Ke et al. in the article "PCA-SIFT: A more distinctive representation for local image descriptors" (Proc. IEEE Conference on Computer Vision and Pattern Recognition, 2004). However, using these techniques to match and register every image in an image database is a time-consuming process when a large image database is involved.

There remains a need for an efficient scene matching algorithm that can be used to identify digital images having matching backgrounds from a collection of digital images.

SUMMARY OF THE INVENTION

The present invention represents a method for identifying digital images having matching backgrounds from a collection of digital images, comprising using a processor to perform the steps of:

determining a set of one or more feature values for each digital image in the collection of digital images, wherein the set of feature values includes an edge compactness feature value that is an indication of the number of objects in the digital image that are useful for scene matching;

determining a subset of the collection of digital images that are good candidates for scene matching by applying a classifier responsive to the determined feature values;

applying a scene matching algorithm to the subset of the collection of digital images to identify groups of digital images having matching backgrounds; and storing an indication of the identified groups of digital images having matching backgrounds in a processor-accessible memory.

This invention has the advantage that it is only necessary to apply the scene matching algorithm to a subset of the digital image collection, thereby greatly reduce the number of images that need to be matched. As a result, the required computation time is reduced by over an order of magnitude.

It has the additional advantage that it is able to select the best candidate images for successful scene matching, while eliminating the images that are likely to perform poorly for scene matching, such as images with large amounts of background occlusion, images that are blurry, and images that contain few meaningful edges and specific objects.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image processing algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments;

however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

Figure 1:
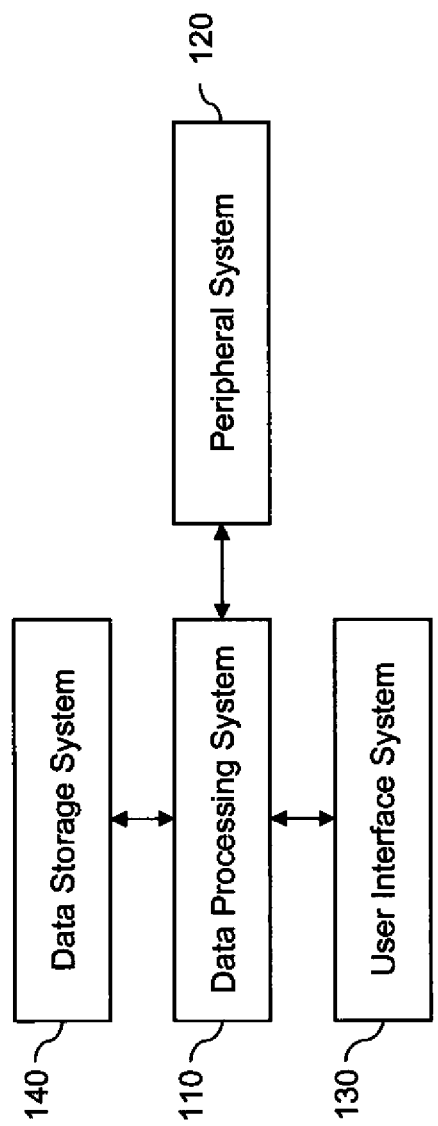
FIG. 1 is a high-level diagram showing the components of a system for classifying digital images according to an embodiment of the present invention.

FIG. 1 is a high-level diagram showing the components of a system for identifying digital images having matching backgrounds according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The present invention represents an efficient method for identifying digital images having a matching background from a collection of digital images. Prior art scene matching algorithms, such as the aforementioned SIFT algorithm disclosed by Lowe are very computationally intensive. As a result, using such scene matching algorithms identify images with matching backgrounds in a large collection of digital images has been impractical because it is necessary to compare each digital image to each of the other digital images in the collection. The present invention represents an improved scene matching algorithm having an improved computational efficiency, which avoids the need to compare each pair of digital images in the collection by performing a preprocessing operation to identify a subset of the image database that can be matched reliably based on their image characteristics.

A number of image characteristics can be considered in the process of choosing the subset of the collection of digital images to be analyzed using a scene matching algorithm. Often the image characteristics that would indicate that a digital image is a good candidate for scene matching are independent of whether digital image has a high degree of image similarity with other digital images in the collection. They may also be unrelated to the image quality of the digital image. For example, digital images that contain large homogenous regions such as water, grass, and sky could be of high quality but they are usually poor candidates for scene matching since they lack specific features that could be used to determine the image capture location. Also, digital images containing of people, which constitute a large portion of consumer image databases, are often not good candidates for scene matching if the people in the picture occlude a significant portion of the background, or if the background is out-of-focus, whereas these characteristics often result in a good quality portrait.

Within the framework of the present invention, a subset of the image collection is identified by analyzing the digital images to determine an image matching usefulness score. In a preferred embodiment, the image matching usefulness score is used to identify digital images which contain complex edge structures in image regions that do not contain people. The identified subset of the image collection is then analyzed using a scene matching algorithm to identify groups of digital images having matching backgrounds.

In a preferred embodiment, scene matching is perform using the SIFT algorithm described in the aforementioned article by Lowe. This method uses key point selection based on maxima and minima of difference-of-Gaussians. The key points are described using gradient magnitude and orientation in that region. The key points typically represent interesting edges and corners in an image. Lowe shows that SIFT methods can be used to match patterns even when other parts of the image change and there is change in scale and orientation of the pattern. However, to be useful for identifying digital images having matching backgrounds, there must be a sufficient amount of detail in the background region.

A large number of digital images in consumer image collections do not contain features that are suitable for identifying matching backgrounds using SIFT-based methods. Analysis of typical consumer collections has shown that only about 10% of the images taken at co-located events could be actually matched using scene-matching techniques. The main reasons for this are: (1) The background elements that can be used for matching images captured at the same location are mostly occluded by the people in the images. (2) The images are blurry due to focusing problems or camera or object motion, resulting in failure of SIFT feature point detection. (3) The images contain few meaningful edges and specific objects, e.g., images with natural scenes, or generic objects such as cabinets and furniture common to many locations.

According to the method of the present invention, the best digital images for successful SIFT-based scene matching are selected, while eliminating digital images with the above-mentioned problems. These identified digital images would also be the best images for matching using other SIFT-like scene matching algorithms (SURF, PCA-SIFT), since they depend on the same image characteristics for scene matching.

A method for automatically grouping images into events and sub-events based on date-time information and color similarity between images is disclosed in U.S. Pat. No. 6,606, 411, to Loui and Pavie, entitled "Method for automatically classifying images into events," which is incorporated herein by reference. The event-clustering algorithm applies a k-means clustering process to image capture date-time information associated with the digital images in order to determining event groupings. Block-level color histogram similarity is then used to determine subdivide the event groupings to determine sub-event groupings. Each sub-event grouping extracted using this method has consistent a color distribution, and therefore, these pictures are likely to have been captured with the same background at the same location. In a preferred embodiment, a few representative digital images from each event are selected for analysis with a scene matching algorithm, thus greatly reducing the number of digital images that need to be matched in the collection. When matching images are identified using the scene matching algorithm, it can be assumed that the other images in the same sub-groupings were also captured at the same location.

According to a preferred embodiment, the problem of selection of a representative subset of images is formulated as a fast binary classification problem, namely separation of suitable representative images from unsuitable images in collections of consumer digital images, by evaluating a series of features that can discriminate between the two classes. The resulting subset of the digital image collection will only include digital images that are suitable for scene matching using SIFT and SIFT-like algorithms.

The present invention will now be described with reference to FIG. 2, which shows a block diagram of a method for identifying digital images having matching backgrounds from a collection of digital images according to an embodiment of the present invention. The input to this process is a digital image collection 200. In a preferred embodiment, the digital image collection 200 is a consumer digital image collection including digital images that have been captured with a digital camera or scanned from hard-copy photographs. The digital images can include both digital still images and digital video images. An event clustering step 202 is used to process the digital image collection to form a clustered digital image collection 204 comprising a series of event clusters including digital images that were captured at a similar time. As described earlier, the event clusters are preferably subdivided by applying a block-level color histogram similarity algorithm. The resulting event clusters (i.e., sub-event clusters) can then generally assumed to be captured at the same location.

The clustered digital image collection 204 is then passed to a feature extraction step 210. The feature extraction step 210 computes a series of features 215 (occlusion extent feature 220, edge compactness feature 230, blur extent feature 240 and other features 245) for each image in the collection.

Figure 3:
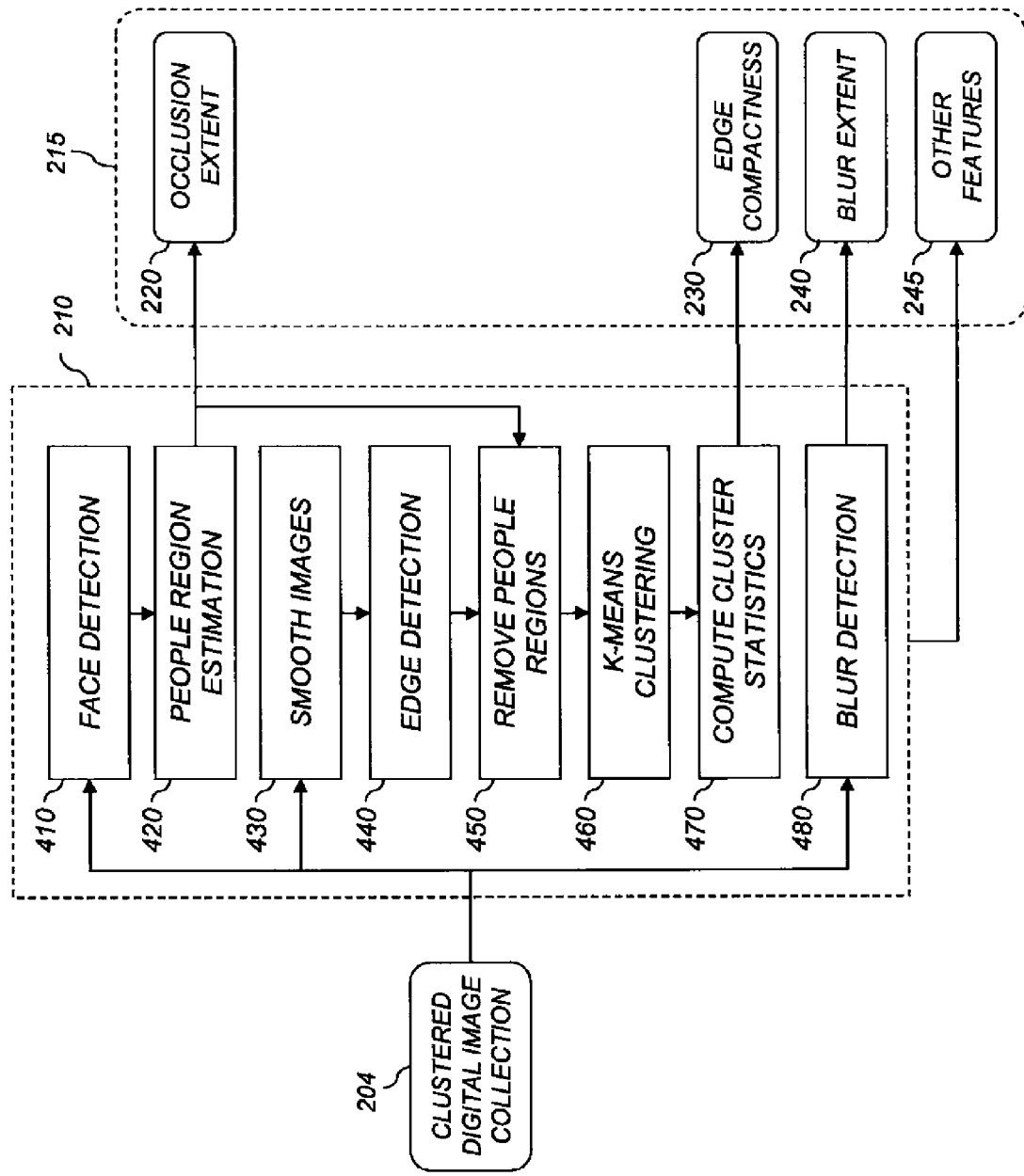
FIG. 3 is a flow chart showing additional details for the feature extraction step of FIG. 2.
Figure 4:
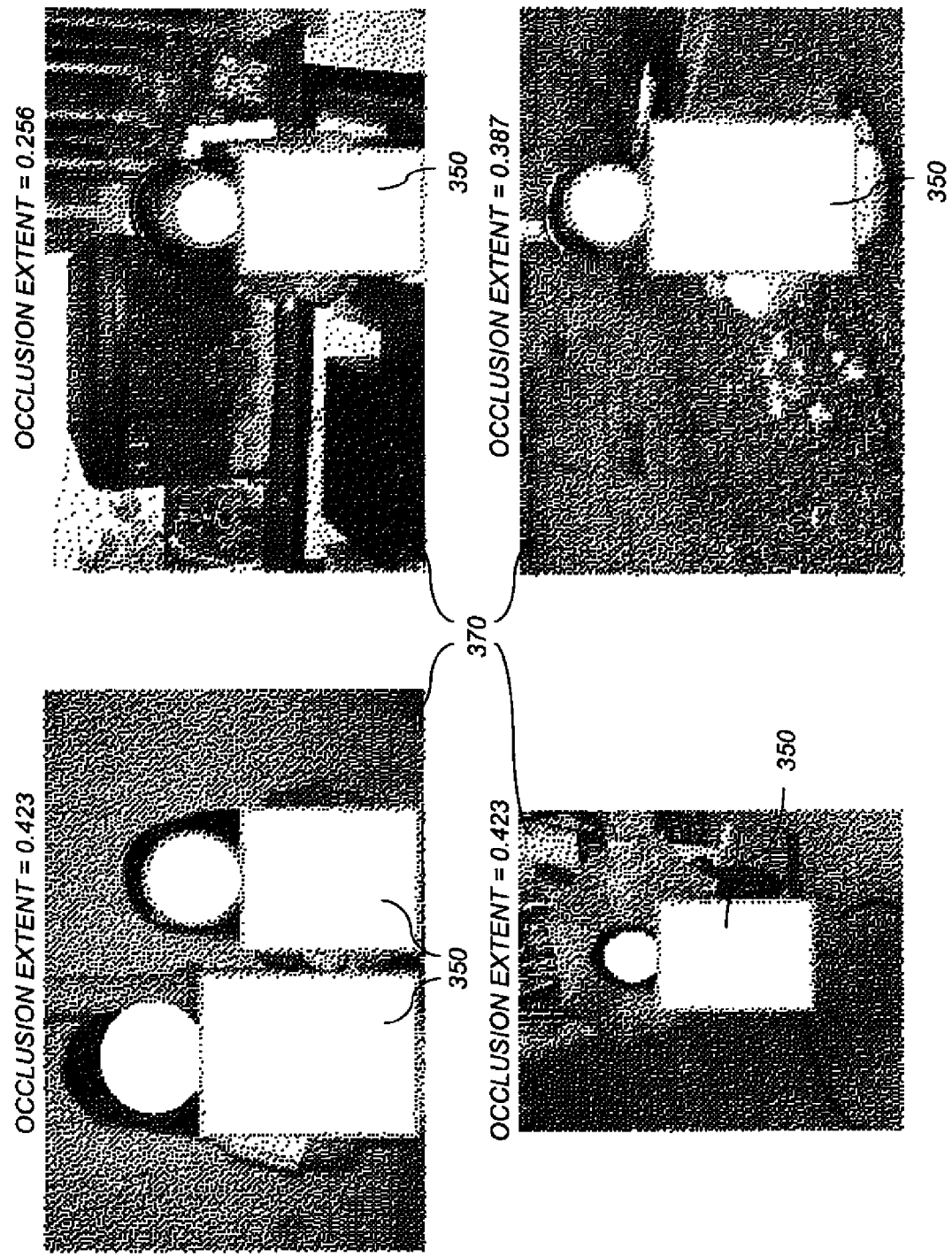
FIG. 4 is a visual illustration of occlusion extent for a set of example images.

Additional details of the feature extraction step 210 will now be described with references to FIG. 3. Based on evidence gathered from a large number of consumer images, the inventors have found that the occlusion of background objects of interest due to the presence of people in the image foreground is an important factor in determining whether a particular digital image is a good candidate for scene matching. The higher the extent of the occlusion, the smaller the probability that the image can be matched with other images of the same scene by using scene matching methods that attempt to match unique objects present in the scene. Typically, a large number of digital images in consumer digital image collections 200 contain people. To determine the occlusion extent feature 220, the approximate people regions in a digital image are determined. This is accomplished using a face detection step 410, followed by a people region estimation step 420. Specifically, we estimate the position of people from the size and the position of a facial circle (as characterized by the radius, together with the x- and y-coordinates of the center of the circle) output by a face detector.

There are a number of known face detection algorithms that can be used for the face detection step 410 in accordance with the present invention. In one embodiment, the face detector described by Jones and Viola in the article "Face Recognition Using Boosted Local Features," (Proc. IEEE Conference on Computer Vision, 2003), which is incorporated herein by reference, is used for the face detection step 410. It has to be noted that there are many other face detection approaches that could be used in accordance with the present invention. Some variations are known to yield higher accuracy, although they may not achieve the speed of this approach.

A "bagging" method can be used to reduce the false detection and improve the accuracy for the face detection step 410.

With this method, three runs of the face detecting algorithm are performed using different parameters. If the face detection results for the three runs satisfy the conditions |x(i)−x(j)|<5, |y(i)−y(j)|<5, and |r(i)−r(j)|<5, where i,j=1, 2, 3 and i≠j, (x(i), y(i)) is the center of the $i^{th}$ detected face and r(i) is the radius of the detected circle encompassing the $i^{th}$ detected face, we consider the face detection to be correct. Considering the number of times each circular face region is detected, the regions that have been detected the highest number of times are chosen as the region detected using the face detecting algorithm.

Next, a people region estimation step 420 is used to estimate the area of the regions of human bodies based on the positions of the detected faces. In one embodiment this is done by making assumptions that (1) the width of the body region is approximately twice as long as the width of the head, and (2) the length of the body region is approximately four times as long as the length of the head. These assumptions are based on averaging the results over 3000 images with different postures of people, including standing and sitting. The identified people regions include both the face regions and the corresponding body regions.

The occlusion extent feature 220 ($k_1$) is calculated as:

$$k_1 = \frac{P}{Q} \quad (1)$$

where P is the total number of occluded pixels in the people regions and Q is the total number of pixels in the digital image. FIG. 3 illustrates the occlusion extent for four different consumer digital images, where the blocked areas indicate estimated people regions 350, and the rest of each image corresponds to the non-people regions 370. The corresponding occlusion extent values are reported above each image. It should be noted that there could be some situations that people overlap with each other, which could result in the calculated occlusion extent values being slightly larger than the true value. However, from the inventors' experimental results, it has been found that this has little influence on the final classification results. Furthermore, this problem can be solved by first sorting the human face by x and y coordinates and then determining the overlap regions of adjacent human faces.

Since the success of scene matching is highly dependent upon the number of unique objects contained in the images, it is desirable to roughly determine the number of unique objects in any candidate image. The larger the number of unique objects contained in the image, the higher the probability that the image will be a good candidate image for scene matching. Edge information is generally the most salient information for the detection of specific objects. The use of an edge-clustering method has been found to be an efficient method for fast object detection. In some embodiments, the number of possible unique objects is evaluated by first spatially clustering the edges and then computing the variance of each cluster. If the variance of each cluster is smaller than some threshold, we consider the cluster to be a specific object.

According to a preferred embodiment of the present invention, the edge compactness feature 230 is determined using the following steps. To remove the small variations in pixel values and false edges due to the illuminations and lightness, the digital images are first processed with a smooth images step 430, which applies Gaussian filters to smooth the digital images. Subsequently, an edge detection step 440 is used to detect edges in the digital images. In a preferred embodiment, the edge detection step 440 applies the well-known Canny edge detectors to the smoothed images, although any edge detector known in the art can be used in accordance with the present invention.

A remove people regions step 450 is then used to subtract any edges falling within the people regions identified in people region estimation step 420. This ensures that the remaining edges are mostly from non-people objects in the image.

A k-means clustering step 460 is used to partition the identified edges into spatially compact edge clusters in which the mean distance of edges from the partition center is minimized. In a preferred embodiment, the k-means clustering step 460 applies the k-means clustering algorithm described by Duda et al. in the book "Pattern Classification" (Second Edition, Wiley, New York, 2001, pp 526-528), which is incorporated herein by reference. Based on experiments, the inventors have found that a value of k=5, corresponding to 5 edge clusters, produces good results for classification. A variance is then determined for each edge cluster using a compute cluster statistics step 470, and the edge compactness feature 230 ($k_2$), is determined as the number of clusters having a variance smaller than a specified threshold.

Some consumer images are of poor quality due to artifacts such as a lack of focus and motion blur, and are therefore not suitable as candidate images for scene matching. A blur detection step 480 is used to determine the blur extent feature 240 to identify such unsuitable images. In a preferred embodiment of the present invention, the blur detection step 480 utilizes the approach described by Tong et al. in the article "Blur Detection for Digital Images Using Wavelet Transform," Proc. IEEE International Conference on Multimedia and Expo, pp. 17-20, 2004), which is incorporated herein by reference. This method uses 2D Haar wavelets to process the input digital images and construct edge maps at each scale. The edge maps are then partitioned and local maxima are computed. As is well-known in the art, edges can be generally classified into four types: Dirac-Structure, Astep-Structure, Gstep-Structure and Roof-Structure. The Roof-Structure edges and Gstep-Structure edges are determined based on edges in different levels. Typically, if blur occurs, both Gstep-Structure edges and Roof-Structure edges tend to occur as edges lose their sharpness. The Gstep-Structure and Roof-Structure edges can together be considered to be soft edges, whereas the other two edge types can be considered to be sharp edges. The blur extent feature 240 ($k_3$) is computed as:

$$k_3 = \frac{N_{GR}}{N_T} \quad (2)$$

where $N_{GR}$ denotes the sum of the number of Gstep-structure edges and Roof-structure edges (i.e., the number of soft edges), and $N_T$ denotes the total number of edges (i.e., the number of soft edges plus the number of sharp edges).

In alternate embodiments of the present invention, the feature extraction step 210 can also be used to determine other features 245 to further improve the accuracy of selections. The other features 245 can be used to characterize various image attributes such as: contrast, brightness, color histogram, and the camera focal length. However, the inventors have found that the inclusion of additional features may not produce a significant improvement in the overall performance of the method. Particularly for those features that are relevant to only certain types of events. The inventors have found that good performance can be obtained for many applications using only the occlusion extent feature 220, the edge compactness feature 230, and the blur extent feature 240.

Figure 2:
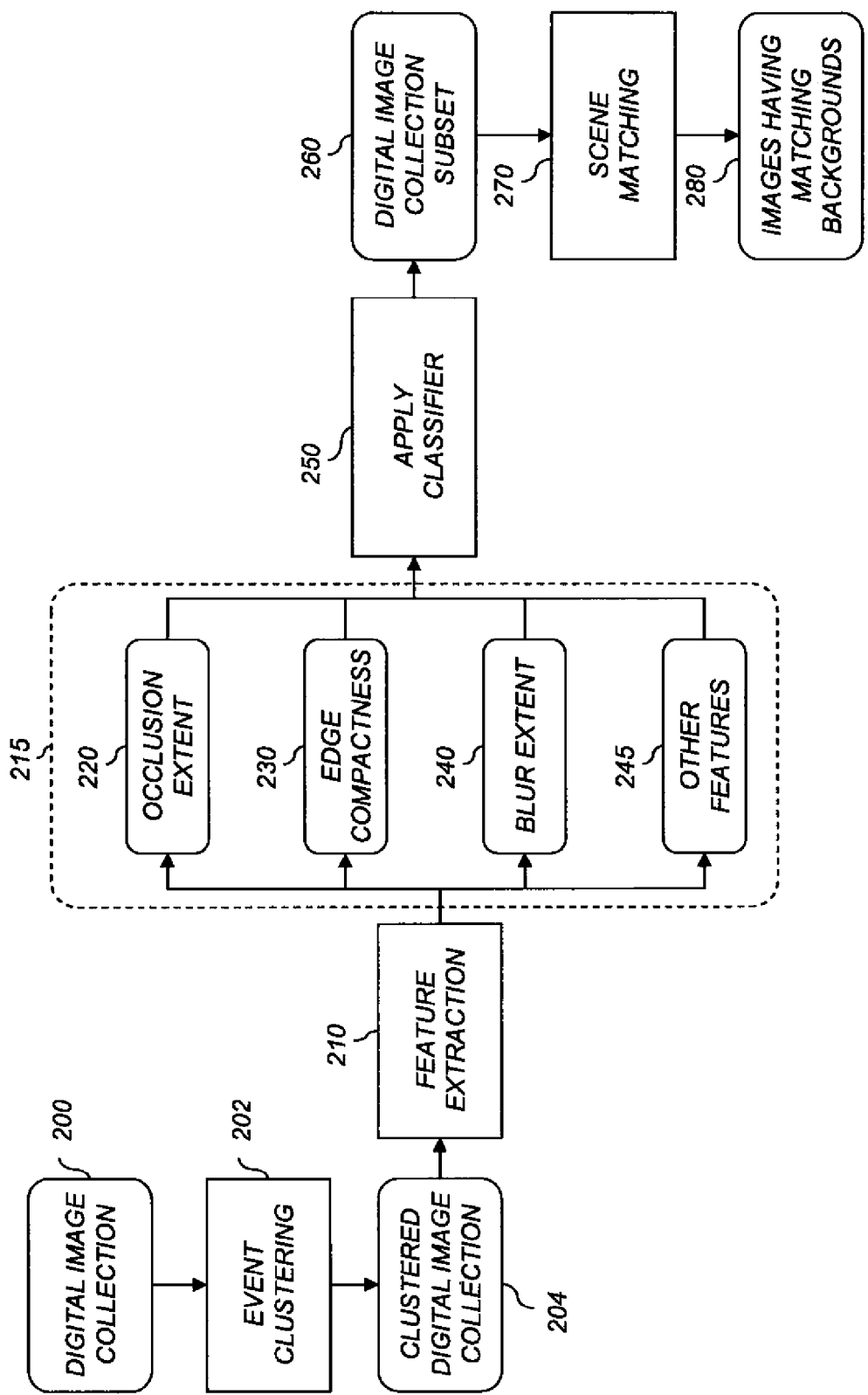
FIG. 2 is a flow chart showing a method for identifying digital images having matching backgrounds according to an embodiment of the present invention.

Returning to a discussion of FIG. 2, an apply classifier step 250 is now used to classify the digital images as to whether they are good candidates for inclusion in a digital image collection subset 260 which is to be used for subsequent scene matching. Given the set of features 215 (10, there are multiple ways to integrate them in one unified framework to create a classifier that classifies the digital images as good candidates for being a representative image for scene matching, or as bad candidates for this purpose.

Figure 5:
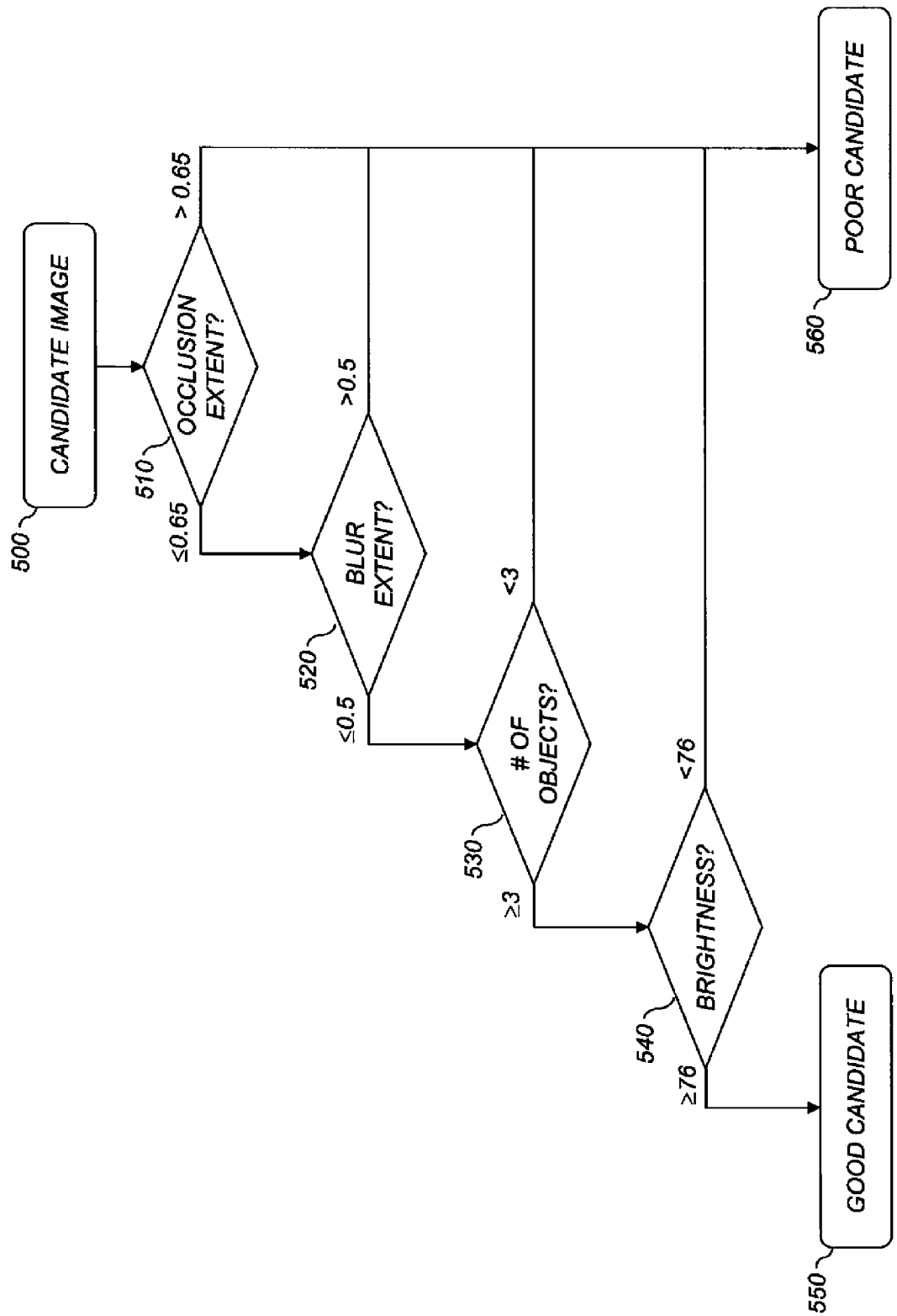
FIG. 5 is a flow chart for a classification tree classifier used for identifying good candidate images for scene matching.

In one embodiment, a rule-based classification tree is used as shown in FIG. 5. In this example, a candidate image 500 is processed to classify it as a good candidate 550 or a poor candidate 560. First an occlusion extent test 510 is used to compare the value of the occlusion extent feature 220 (FIG. 2) to a specified threshold (e.g., 0.65). If the value of the occlusion extent feature 220 exceeds the specified threshold, the candidate image 500 is classified as a poor candidate 560, otherwise execution proceeds to a blur extent test 520.

The blur extent test 520 is used to compare the value of the blur extent feature 240 (FIG. 2) to a specified threshold (e.g., 0.5). If the value of the blur extent feature 240 exceeds the specified threshold, the candidate image 500 is classified as a poor candidate 560, otherwise execution proceeds to a number of objects test 530.

The number of objects test 530 is used to compare the value of the edge compactness feature 230 (FIG. 2) to a specified threshold (e.g., 3). If the value of the edge compactness feature 230 is less than the specified threshold, the candidate image 500 is classified as a poor candidate 560, otherwise execution proceeds to a brightness test 540.

The brightness test 540 is used to compare an average image brightness feature (corresponding to the other features 245 in FIG. 2) to a specified threshold (e.g., 76). If the value of the average image brightness feature is less than the specified threshold, the candidate image 500 is classified as a poor candidate 560, otherwise it is classified as a good candidate.

In a preferred embodiment, the strongest feature is used at the root node of the classification tree, the second strongest feature is used at the second level of the classification tree, and so on. In this way, if a strong feature has already determined that a digital image is a poor candidate, it is not necessary to consider the weaker features. For example, if the occlusion extent of a digital image is very large, the digital image will be designated to be a poor candidate for scene matching after the occlusion extent test 510 and there will be no need to consider other features for this digital image. Therefore, this method can save significant computational time while it maintains high classification accuracy.

Preferably, no more than one digital image from each event cluster in the clustered digital image collection 204 is included in the digital image collection subset 260. In some embodiments, only a single digital image from each event cluster is processed using the feature extraction step 210 and the apply classifier step 250. In other embodiments, all of the digital images in each event cluster are processed, but only one of the digital images is selected for inclusion in the digital image collection subset 260. For example, the apply classifier step 250 can be used to determine all of the good candidates 550 in a particular image cluster. The best candidate for inclusion in the digital image collection subset 260 can then be selected by determining the good candidate having the smallest value of the occlusion extent feature 220. In alternate embodiments, more than one digital image from a particular event cluster can be included in the digital image collection subset 260. For example, the two best candidates can be included.

In another embodiment, the apply classifier step 250 uses a Bayesian classifier rather than the rule-based classification tree shown in FIG. 5. For example, the Naïve Bayesian classification framework described in the aforementioned book "Pattern Classification" by Duda et al. can be used (see pp. 25-26). For illustrative purposes, it will be assumed that the classifier will use three discriminative features; however, the method can easily be extended to utilize more features. According to Bayes' rule, the overall quality classification metric, $k_{all}$, is defined as:

$$k_{all} = \frac{P(\text{good} \mid k_1, k_2, k_3)}{P(\text{poor} \mid k_1, k_2, k_3)} \quad (3)$$

$$= \frac{P(k_1, k_2, k_3 \mid \text{good})P(\text{good})}{P(k_1, k_2, k_3 \mid \text{poor})P(\text{poor})}$$

where P(A) is the probability of A, P(A|B) is the probability of A given B, $k_1$, $k_2$ and $k_3$ are the three feature values, and "poor" and "good" correspond to poor candidate images and good candidate images, respectively. Assuming independence of the features $k_1$, $k_2$ and $k_3$, the given the quality classification metric can be rewritten as:

$$k_{all} = \frac{P(k_1 \mid \text{good})P(k_2 \mid \text{good})P(k_3 \mid \text{good})P(\text{good})}{P(k_1 \mid \text{poor})P(k_2 \mid \text{poor})P(k_3 \mid \text{poor})P(\text{poor})} \quad (4)$$

Each of these condition feature value probability distributions in this expression can be determined experimentally by collecting feature value statistics for populations of good candidate images and poor candidate images. For additional simplification, equal numbers of good and bad candidate images can be assumed so that P(good) and P(bad) can be cancelled from Eq. (4).

In yet another embodiment, the apply classifier step 250 can use an adaptive boosting classification framework such as the well-known AdaBoost classifier, whose usage is described in the aforementioned article by Jones and Viola. AdaBoost classifiers are adaptive in the sense that subsequent classifiers that are built are tweaked in favor of those instances that are misclassified by previous classifiers. AdaBoost provides a good way to assign proper weights to the various features 215. Using the approach, the weak classifiers used are constructed from single features using a Bayesian classifier based on a unitary Gaussian model.

Returning to a discussion of FIG. 2, the digital image collection subset 260, which contains the good candidates for scene matching, are next evaluated using a scene matching step 270 to identify groups of images having matching backgrounds 280. In a preferred embodiment, the scene matching step 270 uses the SIFT-based scene matching algorithm. Alternately, any scene matching algorithm known in the art, such as the aforementioned SURF and PCA-SIFT algorithms can also be used in accordance with the present invention. A preferred SIFT-based scene matching algorithm is described as the alternative embodiment in commonly-assigned U.S. Patent Application Publication 2009/0161962, which is incorporated herein by reference. This scene matching algorithm uses a filtering process to identify SIFT points from unusual objects in the scene for use in matching. In summary, the steps of this method include:

1. Determining background regions for a reference digital image and a target digital image.
2. Locating feature points in the background of the reference and target digital images.
3. Matching feature points in the reference and target digital images.
4. Clustering matched feature points into spatially compact regions.
5. Filtering matched feature points that do not correspond to regions on the same objects.
6. Computing a match score from the filtered matched feature points between the reference and target digital images.

Figure 6:
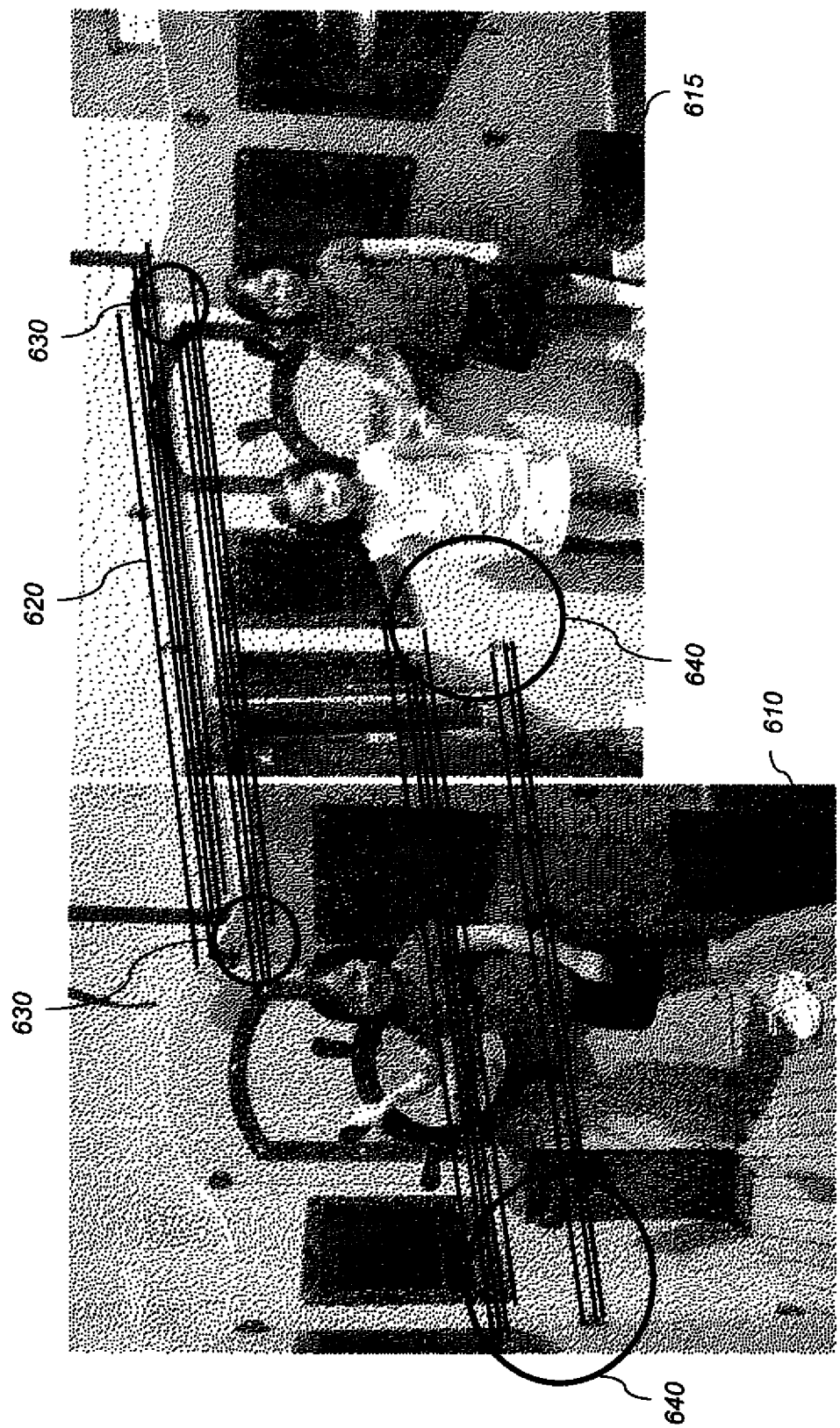
FIG. 6 illustrates matching feature points identified in a pair of digital images using a SIFT-based scene matching algorithm.

FIG. 6 provides a visual illustration of the SIFT-based scene-matching results using a pair of representative images. A first image 610 and a second image 615 are shown that were taken at the same location, and have corresponding backgrounds. A set of correspondence lines 620 is shown connecting matching feature points identified by the SIFT-based scene matching algorithm. The matching feature points are clustered into a first matching image region 630 and a second matching image region 640. Based upon the identified corresponding points, the scene matching step 270 would conclude that the first image 610 and the second image 615 have matching backgrounds and would include them in a group of images having a matching background. Any other digital images in the same event clusters in the clustered digital image collection 204 can also be included in the same group of images.

To demonstrate the improved computational efficiency that can be obtained using the method of the present invention, evaluations were performed using several variations of the scene matching algorithm of the present invention, as well as three traditional three different scene matching algorithms (SIFT, PCA-SIFT and SURF). The metric used for comparison is the computation time for identifying digital images with matching backgrounds for a collection of 3000 consumer digital images corresponding to 46 events. Table 1 shows the resulting computation times for the three traditional scene matching algorithms. In each case, the computation time reflects the time needed to match every pair of digital images in the collection. For comparison, Table 2 shows the computation times obtained using the method of the present invention. Results are shown where three different classifiers (Classification tree, Bayesian and Adaboost) were used for the apply classifier step 250. In each case, the scene matching step 270 used a SIFT-based scene matching algorithm. It can be seen that the method of the present invention provides more than an order of magnitude savings in the computation time for scene matching compared to the traditional scene matching algorithms.

TABLE 1

Computation time for 3000 images using traditional algorithms

| Algorithm | Time (seconds) |
|---|---|
| SIFT | $7.43 \times 10^4$ |
| PCA-SIFT | $4.35 \times 10^4$ |
| SURF | $2.37 \times 10^4$ |

TABLE 2

Computation time for 3000 images using improved algorithms

| Classifier | Time (seconds) |
|---|---|
| Classification Tree | $1.29 \times 10^3$ |
| Bayesian | $2.54 \times 10^3$ |
| AdaBoost | $2.88 \times 10^3$ |

The invention has been described in detail with particular reference to certain preferred embodiments thereof, but it will be understood that variations and modifications can be effected within the spirit and scope of the invention.

| PARTS LIST | |
|---|---|
| 110 | data processing system |
| 120 | peripheral system |
| 130 | user interface system |
| 140 | data storage system |
| 200 | digital image collection |
| 202 | event clustering step |
| 204 | clustered digital image collection |
| 210 | feature extraction step |
| 215 | features |
| 220 | occlusion extent feature |
| 230 | edge compactness feature |
| 240 | blur extent feature |
| 245 | other features |
| 250 | apply classifier step |
| 260 | digital image collection subset |
| 270 | scene matching step |
| 280 | images having matching backgrounds |
| 350 | people regions |
| 370 | non-people regions |
| 410 | face detection step |
| 420 | people region estimation step |
| 430 | smooth images step |
| 440 | edge detection step |
| 450 | remove people regions step |
| 460 | k-means clustering step |
| 470 | compute cluster statistics step |
| 480 | blur detection step |
| 500 | candidate image |
| 510 | occlusion extent test |
| 520 | blur extent test |
| 530 | number of objects test |
| 540 | brightness test |
| 550 | good candidate |
| 560 | poor candidate |
| 610 | first image |
| 615 | second image |
| 620 | correspondence line |
| 630 | matching image region |
| 640 | matching image region |

The invention claimed is:

1. A computer-implemented method comprising:
determining a set of one or more feature values for each digital image in a collection of digital images, wherein the set of feature values includes an edge compactness feature value that is an indication of the number of objects in the digital image that are useful for scene matching, wherein the indicated number of objects excludes at least a portion of the digital image;
determining a subset of the collection of digital images that are good candidates for scene matching by applying a classifier responsive to the determined feature values;
applying a scene matching algorithm to the subset of the collection of digital images to identify groups of digital images having matching backgrounds; and
storing an indication of the identified groups of digital images having matching backgrounds in a processor-accessible memory, wherein the step of determining the edge compactness feature value includes:
- detecting any persons present in the digital image;
- determining a non-person region in the digital image that excludes any detected persons;
- determining an edge map for the determined non-person region of the digital image;
- grouping edges within the edge map into spatially compact clusters; and
- computing the edge compactness feature value responsive to based on the number of spatially compact clusters into which the edges are grouped.

2. The method of claim 1 wherein the set of feature values further includes an occlusion extent feature value, the occlusion extent feature value being an indication of the amount of the digital image that is occluded by persons in the digital image.

3. The method of claim 2 wherein the occlusion extent feature value is determined using a process that includes:
- detecting any persons present in the digital image; and
- determining the fraction of the digital image which is occluded by the detected persons.

4. The method of claim 1 wherein the set of feature values further includes a blur extent feature value, the blur extent feature value being an indication of a sharpness level of the digital image.

5. The method of claim 4 wherein the blur extent feature value is determined using a process that includes:
- determining an edge map for the digital image;
- determining a number of sharp edges in the edge map;
- determining a number of soft edges in the edge map; and
- determining the blur extent feature value responsive to the determined number of sharp edges and the determined number of soft edges.

6. The method of claim 1 wherein the set of feature values further includes a brightness feature value, the brightness feature value being an indication of a brightness level of the digital image.

7. The method of claim 1 wherein the classifier is trained using a first sample of digital images determined to be good candidates for scene matching and a second sample of digital images determined to be poor candidates for scene matching.

8. The method of claim 1 wherein the classifier is a classification tree classifier.

9. The method of claim 1 wherein the classifier is a Bayesian classifier.

10. The method of claim 1 wherein the classifier is an Adaboost classifier.

11. The method of claim 1 wherein the step of applying the scene matching algorithm includes the step of applying a scale invariant feature transform algorithm.

12. The method of claim 1 wherein the step of applying the scene matching algorithm includes the steps of:
- determining the background regions for a reference digital image and a target digital image;
- locating feature points in the background of the reference and target digital images;
- matching feature points in the reference and target digital images;
- clustering matched feature points into spatially compact regions;
- filtering matched feature points that do not correspond to regions on the same objects; and
- computing a match score from the filtered matched feature points between the reference and target digital images.

13. The method of claim 1 wherein the step of determining the subset of the collection of digital images that are good candidates for scene matching further includes:
- applying an event clustering algorithm to group the digital images in the collection of digital images into event groupings; and
- selecting representative images from each event grouping for inclusion in the subset of the collection of digital images.

14. The method of claim 13 wherein the event clustering algorithm determines the event groupings by applying a k-means clustering process to image capture dates and times associated with the digital images.

15. The method of claim 13 wherein the event groups are further sub-divided by performing block-level color histogram similarity.

16. The method of claim 13 wherein the step of determining the set of one or more feature values is only applied to the representative images from each event grouping.

17. A non-transitory computer readable medium having stored thereon instructions that are executable to cause a data processing system to perform the steps of:
- determining a set of one or more feature values for each digital image in the collection of digital images, wherein the set of feature values includes an edge compactness feature value that is an indication of the number of objects in the digital image that are useful for scene matching, wherein the indicated number of objects excludes at least a portion of the digital image;
- determining a subset of the collection of digital images that are good candidates for scene matching by applying a classifier responsive to the determined feature values; and
- applying a scene matching algorithm to the subset of the collection of digital images to identify groups of digital images having matching backgrounds, wherein the step of determining the edge compactness feature value comprises:
  - detecting any portions of the digital image that depict people;
  - determining a non-person region in the digital image, wherein the non-person region excludes the detected portions of the digital image that depict people;
  - determining an edge map for the determined non-person region of the digital image;
  - grouping edges within the edge map into a number of spatially compact clusters; and
  - computing the edge compactness feature value responsive to the number of spatially compact clusters into which the edges are grouped.

18. A computer-implemented method comprising:
- determining a set of one or more feature values for each digital image in a collection of digital images, wherein the set of feature values includes an edge compactness feature value that is an indication of the number of objects in the digital image that are useful for scene matching, wherein the edge compactness feature value is determined by:
  - detecting any portions of the digital image that depict people;
  - determining a non-person region in the digital image, wherein the non-person region excludes any detected portions of the digital image that depict people;
  - determining an edge map for the determined non-person region of the digital image;
  - grouping edges within the edge map into spatially compact clusters; and computing the edge compactness feature value responsive to the number of spatially compact clusters into which the edges are grouped;

determining a subset of the collection of digital images that are good candidates for scene matching by applying a classifier responsive to the determined feature values; and storing an indication of the determined subset of the collection of digital images in a processor-accessible memory.

* * * * *

UNITED STATES PATENT AND TRADEMARK OFFICE
CERTIFICATE OF CORRECTION

PATENT NO. : 8,548,256 B2
APPLICATION NO. : 12/828330
DATED : October 1, 2013
INVENTOR(S) : Loui et al.

Page 1 of 1

It is certified that error appears in the above-identified patent and that said Letters Patent is hereby corrected as shown below:

In the Specification

In Column 9, Line 7, delete "215 (10," and insert -- 215 ($k_i$), --, therefor.

Signed and Sealed this
First Day of April, 2014

Michelle K. Lee
*Deputy Director of the United States Patent and Trademark Office*